Figure 1:
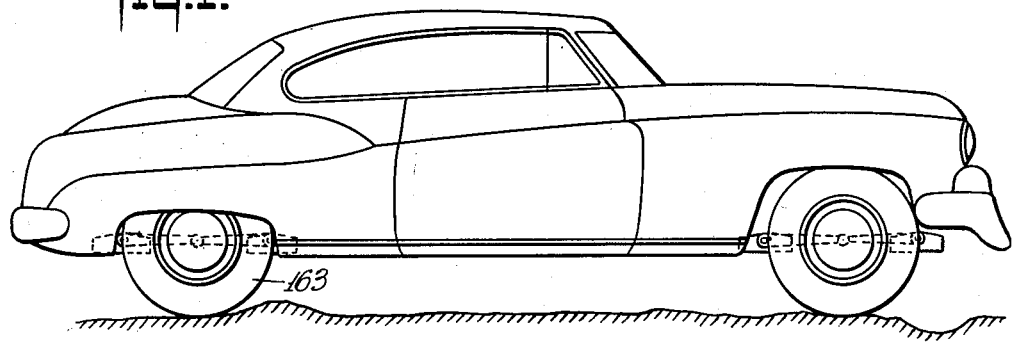

Sept. 25, 1956  J. MERCIER  2,764,404
SHOCK ABSORBER
Filed March 6, 1952  2 Sheets-Sheet 1

INVENTOR
Jean Mercier
BY
Dean Fairbank & Hirsch
ATTORNEYS

Sept. 25, 1956  J. MERCIER  2,764,404
SHOCK ABSORBER
Filed March 6, 1952  2 Sheets-Sheet 2
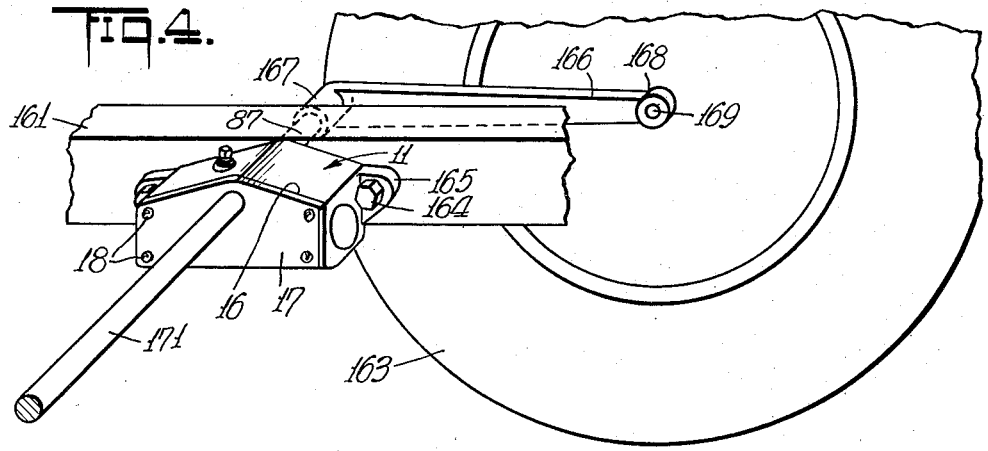
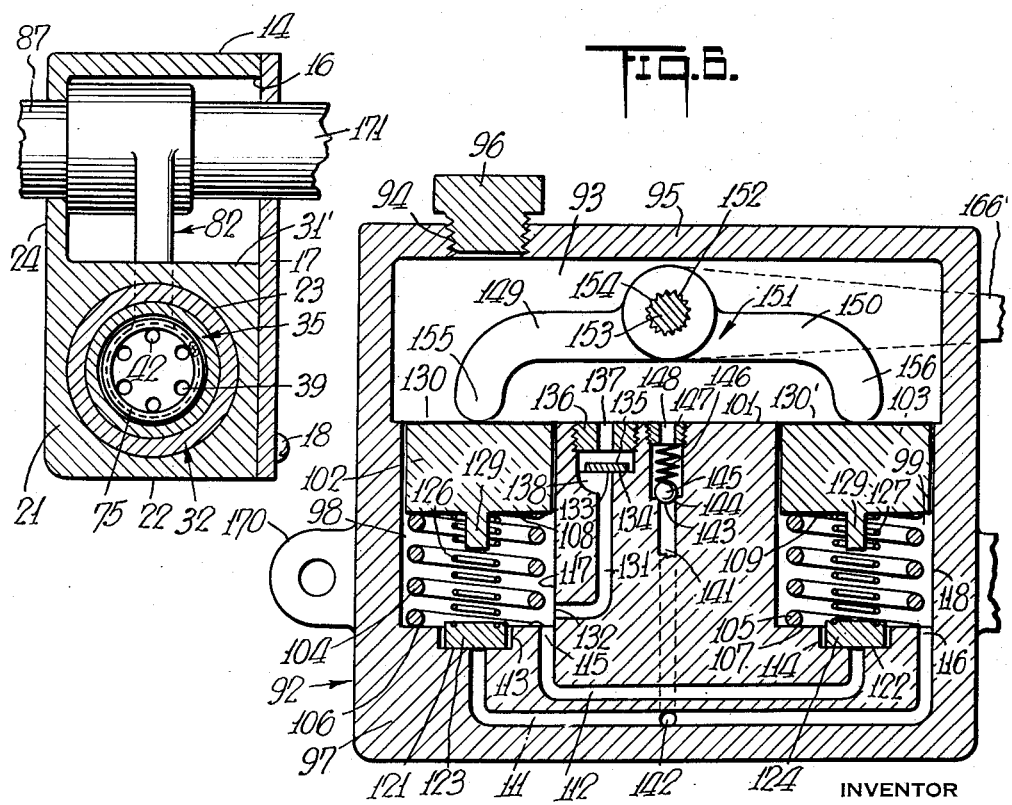
INVENTOR
Jean Mercier
BY
Dean Fairbank & Hirsch
ATTORNEYS

United States Patent Office 2,764,404
Patented Sept. 25, 1956

2,764,404

SHOCK ABSORBER

Jean Mercier, New York, N. Y.

Application March 6, 1952, Serial No. 275,056

15 Claims. (Cl. 267—8)

This invention relates to shock absorbers, more particularly of the type to eliminate the oscillations of the spring suspension of a vehicle.

As conducive to an understanding of the invention, it is noted that when the wheel of a moving vehicle rides over a bump in the road, such wheel will quickly rise with respect to the chassis of the vehicle from which it is suspended, usually by a suitable spring. The spring, which is normally compressed or stressed by a force equal to the weight of the vehicle thereon when the vehicle is in neutral or intermediate position, such as when it is not moving or it is riding along a level surface, by reason of the upward movement of the wheel, will be further compressed or stressed. Similarly, if the wheel should ride into a depression or hole in the road, the wheel would fall with respect to the chassis and the spring would be extended or unstressed from its normal position.

As a result of the stressing of the spring, an upwardly directed force will be directed against the chassis of the vehicle which is greater than the counter force in a downward direction caused by the weight of the vehicle. As a result of the unstressing of the spring the downwardly directed force caused by the weight of the vehicle would be greater than the counter force in an upward direction caused by the unstressed spring. As a result the chassis of the vehicle would quickly rise or fall and as such movement might cause the spring to be respectively unstressed or stressed beyond its normal stress at neutral position, the chassis of the vehicle would oscillate up and down for some time with each bump or depression encountered by the wheel, until the spring stress was stabilized at its neutral position. As a result of such oscillations the vehicle would be extremely uncomfortable for the passenger and any cargo carried by the vehicle would be jarred considerably.

Where a shock absorber is provided to reduce or eliminate such oscillations and the restraining action of the shock absorber for the shock initiated stroke and the return stroke to the normal position of the spring are the same, if such restraining action is great, the spring will be relatively ineffective in reducing jarring due to the riding of the wheel over a bump or a hole and if the restraining action is low, the shock absorber will have but little utility in eliminating oscillations.

Where a shock absorber is used that is not completely sealed, dirt and mud may enter into the operating parts thereof with resultant jamming of the shock absorber and consequent ineffectiveness thereof and this is especially true when the shock absorber is used on military vehicles which are driven through open fields in which mud and dirt may be encountered.

It is accordingly among the objects of the invention to provide a shock absorber which is relatively simple in construction and has but few parts which are not likely to become out of order and the working parts of which are completely sealed to prevent the entry of dirt and mud therein, which device offers little or no resistance to the movement of the wheel in one direction from its intermediate or neutral position on its shock initiated stroke, but which on the return stroke offers a resistance that at all times is substantially equal to the difference between the weight of the vehicle on such wheel and the reaction of the suspension spring of the vehicle which mounts such wheel, thereby substantially eliminating oscillation of the vehicle.

According to the invention the shock absorber comprises a sealed casing having piston means therein, controlled by the vertical movement of the wheel, desirably movable in suitable fluid filled cylindrical chambers to two extreme positions at the ends of each cylindrical chamber respectively from an intermediate or neutral position of equilibrium.

By means of suitable valves associated with the piston means and controlling the flow of fluid through associated passageways from one chamber to the other, the initial movement of the piston means from the intermediate position toward one or the other extreme positions due to the shock initiated stroke on the wheel is preferably substantially unimpeded, and is effected with substantially no dampening or shock absorbing action. However, the valves are so arranged that upon return movement of the piston means toward the intermediate position, the flow of fluid through such passageways will be impeded by such valves and the movement of the piston is permitted only by reason of restricted escape of fluid from the chambers so that such movement will be relatively slow and consequently when the intermediate position is reached it will not be passed.

Figure 2:
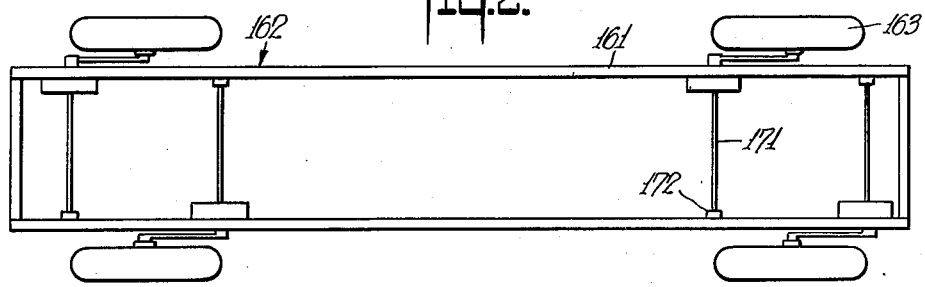
Figure 3:
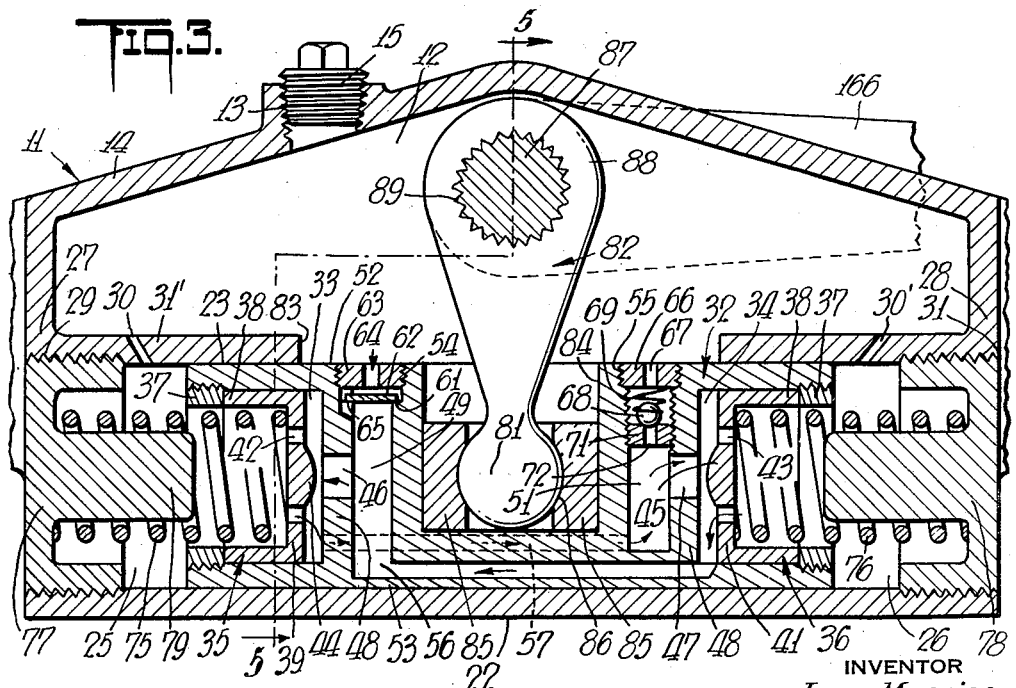

In the accompanying drawings in which are shown one or more of various possible embodiments of the several features of the invention, Fig. 1 is a diagrammatic view of a vehicle incorporating the shock absorber illustrating one mode of application of the invention, Fig. 2 is a bottom plan view of the vehicle shown in Fig. 1, Fig. 3 is a longitudinal sectional view of one embodiment of the shock absorber, Fig. 4 is a fragmentary detail view on a larger scale showing the shock absorber incorporated on a vehicle, Fig. 5 is a fragmentary transverse sectional view taken along line 5—5 of Fig. 3, and Fig. 6 is a longitudinal sectional view of another embodiment of the shock absorber.

Referring now to the drawings, the shock absorber shown in Figs. 3, 4 and 5 desirably comprises an elongated casing 11 which may be of any suitable rigid material such as cast iron or steel. The upper portion 12 of the casing which preferably is hollow, defines a reservoir which may be charged with fluid through a filling port 13 in the top wall 14 of the casing normally closed by a removable closure plug 15. The reservoir 12 desirably has an elongated opening along one side thereof as at 16, normally closed by a suitable closure plate 17 affixed to the casing as by screws 18.

The lower portion 21 of the casing adjacent the bottom wall 22 thereof desirably has a longitudinal bore 23 therein substantially midway between side wall 24 of the casing and closure plate 17. The bore 23 which defines a chamber 25, 26 at the respective ends thereof, desirably extends from end wall 27 of the casing to end wall 28 thereof, said end walls having openings 29 and 31 leading into the respective ends of bore 23.

As shown in Fig. 3 each chamber 25, 26 desirably is in communication with the reservoir 12 by means of a relatively small diameter passageway 30 and 30' extending through the upper wall 31' of bore 23.

Snugly fitting in the bore 23 and slidable therein is a cylindrical piston 32 of length shorter than that of bore 23 and desirably having longitudinally aligned, preferably cylindrical cavities 33 and 34 in each end thereof respectively. Slidably mounted in each of said cavities respectively, is a substantially cup-shaped slide valve 35 and 36, said slide valves being retained in the associated cavity by means of a retaining ring 37, screwed into the corresponding threaded end of the cavity and against which the end 38 of the associated slide valve may abut.

The end wall 39, 41 of each of the slide valves has a plurality of bores 42, 43 therethrough respectively, desirably arranged in a ring about an associated axial valve head 44, 45 extending outwardly therefrom, said valve heads being normally urged to seat against the periphery of an axial opening 46, 47 in the floor 48 of the associated cavity 33, 34 to seal said openings. Each of the openings 46, 47 is in communication with a bore 49, 51 respectively, said bores extending transversely through said piston 32 desirably from the upper surface 52 thereof to, but not through the lower surface 53 thereof. Each of the transverse bores 49, 51 has a port 54, 55 at the upper surface 52 of piston 32, and are in communication respectively with longitudinal bores 56, 57 which are desirably positioned adjacent the lower surface 53 of the piston 32.

The port 54 of bore 49 is desirably of enlarged diameter to form a seat 61 for a valve disc 62. A plug 63 having a bore 64 therethrough is screwed into port 54 and is spaced from valve seat 61 so that the disc 62 may move between said seat 61 and said plug 63 to seal bore 64 in the manner hereinafter described. The valve seat 61 desirably has a passageway 65 therein leading into bore 49 so that when said disc 62 is on seat 61, fluid may flow through bore 64 and passageway 65 into bore 49.

The port 55 of bore 51 desirably has a plug 66 screwed therein which has an axial bore 67. A coil spring 69 is compressed between plug 66 and a ball 68 so that the latter normally closes an axial bore 72 in a plug 71 also screwed in port 55 and spaced from plug 66.

Although the valve heads 44, 45 may be urged to seal the associated opening 46, 47 in any suitable manner, in the embodiment herein shown a pair of coil springs 75, 76 are positioned respectively between the end wall 39, 41 of the associated cup-shaped slide valves 35, 36 and a closure plug 77, 78 screwed respectively into each of the openings 29 and 31 of bore 23, said closure plugs 77, 78 each desirably having an axial stud 79 protruding inwardly therefrom which prevents lateral displacement of the associated coil spring.

The coil springs 75 and 76 are so designed that when the piston 32 is in its intermediate or neutral position shown in Fig. 3, midway between the ends of the bore 23, the springs 75 and 76 will be substantially fully extended and hence exert substantially no pressure against the associated slide valves 35 and 36.

Means are desirably provided to reciprocate the piston 32 in bore 23 from its intermediate position shown in Fig. 3 to one or the other of its extreme positions adjacent closure plugs 77, 78. Although any suitable means may be used for this purpose, as shown in Fig. 3, the ball end 81 of an actuating arm 82 desirably extends through a longitudinal slot 83 in the upper wall 31' of bore 23 into a transverse cavity 84 centrally located in piston 32. Cavity 84 is desirably cylindrical as shown and slidably mounts a pair of arcuate segments 85 which, when juxtaposed form a ring. The inner wall of each of said segments desirably has a concave groove 86 therein which form a socket for the ball end 81 of actuating arm 82. Thus, upon oscillation of a transverse shaft 87 on which the upper end 88 of the arm 82 is affixed as by splining as at 89, the piston will be reciprocated longitudinally in bore 23 and the segments 79 reciprocated vertically in transverse cavity 84.

The embodiment of the shock absorber diagrammatically shown in Fig. 6 desirably comprises a casing 92 of any suitable material such as cast iron or steel. The upper portion 93 of the casing 92 which preferably is hollow, defines a reservoir which may be charged with fluid, through a filling port 94 in the top wall 95 of the casing, normally closed by a removable closure plug 96.

The lower portion 97 of the casing desirably has a pair of vertical cylindrical chambers 98 and 99 therein, extending desirably from the floor 101 of reservoir 93. Each chamber has a piston 102 and 103 slidable therein, said pistons being normally urged upwardly by means of an associated coil spring 104 and 105, respectively, compressed between the floors 106 and 107 of the associated chamber and the undersurface 108, 109 of the associated pistons 102 and 103.

The chambers 98 and 99 are in communication with each other by means of a pair of passageways 111 and 112. The outlets 113 and 114 of said passageways 111 and 112, respectively are axially positioned in the floors 106 and 107 of chambers 98 and 99, respectively, and the inlets 115 and 116 of said passageways are desirably positioned in said floors 106 and 107 adjacent the side walls 117, 118 of said chambers.

Each of the outlets 113 and 114 is desirably of enlarged diameter to define seats 121 and 122 for valve disks 123 and 124, respectively, each of said disks having a coil spring 126 and 127 associated therewith, respectively positioned between the associated valve disk and the undersurface of the associated piston 102 and 103, said undersurfaces each having an axial projection 129 encompassed by the associated coil springs 126, 127 to prevent lateral displacement of said springs.

The coil springs 126 and 127 which are coaxial with coil springs 104 and 105, respectively, and encompassed thereby are so designed that when the pistons 102 and 103 are in their intermediate position shown in Fig. 6, with their top surfaces 130, 130' desirably flush with the floor 101 of reservoir 93, the springs 126 and 127 will be substantially fully extended and hence exert substantially no pressure against the associated valve disks 123, 124. In this position of the pistons 102 and 103, the coil springs 104, 105 are slightly compressed and tend to urge the associated pistons 102 and 103 upwardly.

The chamber 98 desirably is in communication with reservoir 93 by means of a passageway 131, one end 132 of which leads into the chamber 98 near the floor 106 thereof and the other end 133 of which leads into said reservoir. Desirably the end 133 of passageway 131 is of enlarged diameter to form a seat 134 for a valve disk 135. A plug 136 having a bore 137 therethrough is screwed into said enlarged end 133 and is spaced from said valve seat 134 so that the disk 135 may move between said seat 134 and said plug 136 to seal bore 137 in the manner hereinafter described. The valve seat 134 desirably has a passageway 138 therein leading into passageway 131 so that when said disk 135 is on seat 134, fluid may flow through bore 137 and passageways 138, 139 into chamber 98.

The passageway 111 desirably also is in communication with reservoir 93 through a passageway 141, one end 142 of which leads into said passageway 111, and the other end 143 of which leads into reservoir 93. The end 143 desirably is of enlarged diameter to form a seat 144 for a ball valve 145, which is normally retained on its seat 144 by a coil spring 146 compressed between said ball 145 and a plug 147 screwed into the enlarged end 143, and having a bore 148 therethrough.

Means are desirably provided to reciprocate the pistons 102 and 103 in their associated chambers 98 and 99 in such manner that as the volume of one of the chambers is decreased by downward movement of the piston therein, the volume of the other will be increased by upward movement of its associated piston.

Such means desirably comprises a rock lever 151 having a central bore 152 through which extends a transverse shaft 153, the latter being affixed in said bore as by splining as at 154. The rock lever 151 desirably has a pair of opposed laterally extending arms 149, 150, each with a downwardly turned end 155 and 156 against which the top surfaces 130, 130' of pistons 102 and 103 are pressed respectively by the coil springs 104, 105, so that upon oscillation of said shaft 153 from the position shown in Fig. 6 as one of the pistons is forced into its associated chamber to compress the associated coil spring 104 for example, the other will be forced out of its associated cylinder by the associated compressed coil spring 105 and vice versa.

The shock absorber shown in Fig. 3 is desirably affixed to side bars 161 of the chassis 162 of the vehicle near each of the wheels 163 thereof as by screws 164 extending through lugs 165, desirably formed integral with the casing 11. The shaft 87 which mounts the actuating arm 82 desirably extends laterally outwardly from the side wall 24 of the casing, as shown in Fig. 5, and has a lever 166 affixed at the end thereof as at 167. The free end 168 of the lever is desirably mounted on the axle 169 of the associated wheel 163 in conventional manner so that the wheel is free to rotate.

The shock absorber shown in Fig. 6 is also desirably affixed to the side bars of the chassis by suitable screws extending through lugs 170 integral with the casing 92. The shaft 153 which mounts the rock lever 151 desirably extends laterally outward from the side wall of the casing and has a lever 166' affixed at the end thereof. The free end of the lever is also desirably mounted on the axle 169 of the associated wheel 163 in conventional manner.

Each of the wheels of the vehicle desirably has a spring associated therewith. In the illustrative embodiments herein shown, such spring is a torsion bar 171 which extends transversely across the chassis. One end of each torsion bar 171 is affixed as by splining as at 172 to one of the side bars 161 and the other end of the torsion bar is affixed to shaft 87 or 153 as the case may be, so as to be rigid therewith. If desired, the shaft 87 or 153 may comprise an elongation of the torsion bar itself so that the actuating arm 82 or rock lever 151 will be splined thereto.

In order that the operation of the shock absorbers shown herein may be clearly understood, certain typical specifications will be assumed, it being understood that such specifications are merely illustrative.

Thus, it will be assumed that the weight of the vehicle on each wheel is 2,000 pounds when the vehicle is in neutral position, i. e., at rest or riding on a level surface and under such conditions the force on the end 168 of arm 166 is 2,000 pounds and the torsional stress on bar 171 is illustratively 2,000 p. s. i. and the levers 166, 166' desirably extend parallel to the side bars 161 of the chassis 162.

With 2,000 p. s. i. stress on the torsion bar, the actuating arm 82, as shown in Fig. 3, is set in vertical position so that the piston 32 will be in the intermediate position in bore 23, and the rock lever 151 is set to extend parallel to the floor 101 of reservoir 93, so that the pistons 102 and 103 will also be in the intermediate position shown in Fig. 6.

It will also be assumed that the torsion bar may be stressed from zero to 4,000 p. s. i. and when the torsion bar is under no stress, the levers 166 and 166' will be displaced 45 degrees in a clockwise direction from the intermediate position shown in Figs. 3 and 6 and when the torsion bar is under a maximum stress of 4,000 p. s. i., the levers 166, 166' will be displaced 45 degrees in a counterclockwise direction from such intermediate position.

In the intermediate position of the piston 32 of Fig. 3 and pistons 102, 103 of Fig. 6, as the respective springs 75, 76 and 126, 127, are fully extended, they will be under substantially zero compression or stress. When levers 166, 166' have rotated 45 degrees in a counterclockwise direction, such as when the wheel hits a bump in the road and torsion bar 171 is stressed to 4,000 p. s. i., the springs 76 and 126 are fully compressed and exert a force of say 200 pounds in the illustrative embodiment herein, against slide valve 36 and valve disk 123, respectively. At this time the force exerted by the fully extended springs 75 and 127 is zero.

When levers 166, 166' have rotated 45 degrees in a clockwise direction such as when the wheel goes into a deep hole in the road and the stress on torsion bar 171 is reduced to zero, the springs 75 and 127 are fully compressed and exert a force of 200 pounds against slide valve 35 and valve disk 124 respectively. At this time the force exerted by the fully extended springs 76 and 126 is zero.

It will also be assumed in the illustrative embodiments herein shown that the cross sectional area of both openings 46, 47 and the outlet ends 113, 114 is 1/10 of a square inch and the transverse cross sectional area of piston 32 and pistons 102, 103 is 10 square inches. With the length of actuating arm 82 and each of the legs 149 and 150 of lever 151, 2 inches and the length of levers 166 and 166' 20 inches, the lever ratio is 20 to 2 so that 10 times the force applied to the wheel will be applied to move piston 32 or pistons 102, 103, respectively.

Operation

Referring to the embodiment shown in Figs. 1 to 5, if one of the wheels of the vehicle should hit or ride over a bump of such height that the lever 166 is rotated 45 degrees in a counterclockwise direction, the ball end 81 of actuating arm 82 will also be moved in a counterclockwise direction urging the piston 32 to the right from the intermediate position shown in Fig. 3. Such movement of the piston 32 will compress the normally substantially fully extended coil spring 76 to move the slide valve 36 toward the end wall 48 of cavity 34 so that the valve head 45 will seal opening 47. However, as the opening 46 will remain open due to the movement of piston 32 to the right so that the end 38 of slide valve 35 abuts against retaining ring 37, fluid will flow from chamber 26 through openings 43, passageway 56, opening 46 and openings 42 into chamber 25. Due to such flow of fluid from chamber 26 to chamber 25, the movement of the piston 32 to the right due to the shock initiated stroke caused by the bump in the road will be substantially unimpeded except for the relatively low resistance caused by the flow of fluid through the openings and passageway 56. The resistance of coil spring 76 which exerts a progressively increasing counter force reaching a maximum of 200 pounds when the piston has reached the limit of the stroke, also has little effect on the movement of piston 32. This is due to the fact that as the torsion bar 171 would have to be stressed an additional 2,000 p. s. i. from its normal tension of 2,000 p. s. i. to effect 45 degree displacement of the lever 166, the effective force imparted to the end 168 of lever 166 by the upward movement of the wheel is equal to 2,000 pounds. As lever 166 and actuating arm 82 have a ratio of ten to one, the force applied to move the piston to the right is 20,000 pounds which will readily overcome the maximum resistance of 200 pounds of spring 76 even when it is fully compressed. It is apparent therefore that the movement of piston 32 from its intermediate position to its extreme position to the right will occur very rapidly and hence there will be substantially no restraint on the free upward movement of the wheel as it hits a bump so that substantially no jarring of the vehicle will occur as it will continue to move in substantially the same horizontal plane as it did before the impact.

When the torsion bar 171 has been stressed as above described due to the wheel riding over a bump, the tendency of the torsion bar to unstress would cause the chassis of the vehicle to be lifted quickly with respect to such wheel. Such movement of the chassis would unstress the torsion bar beyond its intermediate or normal condition when it is under a stress illustratively of 2,000 p. s. i. and the chassis would then fall by reason of its weight of 2,000 pounds on each wheel. Such movements of the chassis would normally continue for some time before the intermediate or normal condition was reached and retained and an unpleasant oscillation would occur. Such oscillation, however, is prevented by the shock absorber herein in the following manner:

As the stressed torsion bar 171 starts to unstress, it will tend to rotate the shaft 87 in a clockwise direction. As a result the arm 82 and lever 166 will also tend to rotate in a clockwise direction which, unless restrained, would cause the chassis of the vehicle to rise with respect to the wheel and the piston 32 to move to the left. A slight movement of the piston 32 to the left will cause the fluid in chamber 25 to move the slide valve 35 to the right so that valve head 44 will seal opening 46. As the torsion bar is under a stress of 2,000 p. s. i. greater than its stress at its intermediate or normal position, the force applied to piston 32 at the beginning of its return movement to the left will be 20,000 pounds, by reason of the 10 to 1 ratio of lever 166 to arm 82. As the cross sectional area of the end of piston 32 is ten square inches, by the formula $F=P \times A$, 2,000 pounds pressure per square inch will be exerted on the fluid in chamber 25. Such pressure of 2,000 p. s. i., through openings 42, passageway 57, bore 51 and opening 47 will also be exerted against the valve head 45 seated on said opening 47.

As the area of opening 47 in the illustrative embodiment herein is 1/10 of a square inch, by the formula $F=P \times A$, the force required to retain valve head 45 seated, is 200 pounds and as this is the force exerted by the fully compressed spring 76 against the slide valve 36, opening 47 will be maintained closed. Thus, as both openings 46 and 47 are sealed, no fluid can be displaced through the passageways 56 and 57 from chamber 25 to chamber 26.

As a result, although the wheel of the vehicle has risen rapidly the chassis of the vehicle will not rise immediately as the restraint on the free return movement of piston 32 will prevent unstressing of torsion bar 171.

In order that the piston 32 may return slowly to its intermediate position so that the chassis of the vehicle can rise to its normal position with respect to the raised wheel to ready the shock absorber for the next shock initiated impact, means are provided to permit escape of fluid from chamber 25 due to the force applied against such fluid by the piston. Although the slight play between the piston 32 and the bore 23 will permit seepage of fluid from chamber 25 to chamber 26 and also to the reservoir 12, the relatively small orifice 30 between chamber 25 and the reservoir 12 is also provided.

As fluid is displaced from chamber 25 and the piston 32 moves slowly to the left, the tension on spring 76 will progressively decrease. The movement of the piston will permit unstressing of the torsion bar and slow rise of the chassis of the vehicle with respect to the wheels.

As the stress on torsion bar 171 decreases, say to 1,000 p. s. i. above its normal or intermediate stress, the force applied to piston 32 will decrease to 10,000 pounds and the pressure on the fluid in chamber 25 will correspondingly decrease to 1,000 p. s. i. Although the force of spring 76 has also been reduced by reason of its extension with the movement of piston 32 to the left, the spring is so designed that when the pressure on the fluid in chamber 25, due to the unstress of torsion bar 171 has fallen to 1,000 pounds per square inch, the tension of spring 76 will be 1000 pounds which is sufficient to retain the valve head 45 seated.

It is apparent therefore that as the piston 32 moves slowly to its intermediate position the torsion bar 171 will gradually be unstressed from a tension of 4,000 pounds to a tension of 2,000 p. s. i. at which time the weight of 2,000 p. s. i. on the wheel of the vehicle will effect an equilibrium. Thus, substantially no oscillations of the chassis of the vehicle will occur.

At this time both springs 75 and 76 will be unstressed and the shock absorber will be ready for the next shock initiated impact.

The operation of the shock absorber in the event that one of the wheels of the vehicle should ride into a hole or depression in the road is identical to the operation above described except that the piston 32 will initially move to the left and will thereupon return to the intermediate position. As the operation of this reverse movement will be obvious in view of the description heretofore made, it will not be described.

With the movement of piston 32 to the right as previously described, as fluid flows through passageway 56 and transverse bore 49, the disc 62 will be moved against plug 63 to seal opening 64. As a result, substantially all of the fluid displaced from chamber 26 through passageway 56 will pass into chamber 25. Similarly, when the piston 32 moves to the left from the intermediate position shown in Fig. 3, the fluid displaced from chamber 25 as it passes through openings 42, passageway 57, bore 51, opening 47 into chamber 26 will fill such chamber and will also pass through opening 43, passageway 56 and bore 49 to retain the valve disc 62 in sealing position with respect to the bore 64 in plug 63. Thus, regardless of the initial direction of movement of the piston 32, the bore 64 will be closed so that fluid displaced from one of the chambers 25, 26 through the associated passageway 56, 57 will be precluded from passing into the reservoir.

When the piston is in the intermediate position shown in Fig. 3, substantially no pressure will be exerted on the fluid in chambers 25 and 26 and hence the valve disc 62 will remain on its seat 61. Consequently, fluid will flow from reservoir 12 through bore 64 and passageway 65 into transverse bore 49 and as the reservoir 12 is above the level of the top of the chambers 25 and 26, the fluid from such reservoir will fill such chambers to ready the shock absorber for action.

Upon the return movement of the piston 32 from its extreme position to the right to its intermediate position shown in Fig. 3, in the event the pressure of the fluid in bore 51 should exceed a predetermined amount such as if the passageway 30 should clog or insufficient fluid should seep between piston 32 and bore 23, the ball valve 68 will be displaced from its seat by the pressure on the fluid in bore 51 so that such fluid may pass through bores 72 and 67 into the reservoir 12 to relieve the excess pressure, thereby preventing injury to the equipment. It is of course to be understood that a safety valve similar to valve 68 could be associated with the bore 49 to alleviate excess pressure upon the movement of the piston 32 from the left hand extreme position to the intermediate position.

Referring to the embodiment shown in Fig. 6, if one of the wheels of the vehicle should hit or ride over a bump of such height that the lever 166' is rotated 45 degrees in a counterclockwise direction, the shaft 153 will also rotate in a counterclockwise direction.

As a result, the end 155 of leg 149 of rock lever 151 will force piston 102 downwardly into chamber 98. This will compress coil springs 104 and 126 and the compression of spring 126 will retain the valve disk 123 in seated position over the inlet end 113 of passageway 111. At the same time the end 156 of leg 150 of rock lever 151 will be moved away from piston 103 and the latter will therefore be moved outwardly from chamber 99 by the normally compressed coil spring 105, the coil spring 127 remaining fully extended under no compression.

Due to the movement of piston 102 into chamber 98 the fluid in such chamber will be forced through opening 115, passageway 112 and outlet 114 against valve disk 124. As the latter is merely seated against the outlet 114 with substantially no force exerted thereagainst by reason of the fully extended coil spring 127, substantially no impedance will be afforded to the free flow of fluid from chamber 98 through passageway 112 into chamber 99.

Due to such free flow of fluid from chamber 98 to chamber 99, the downward movement of piston 102 due to the shock initiated stroke caused by the bump in the road will be substantially unimpeded except for the low resistance caused by the flow of fluid through the passageway 112. The resistance of coil spring 126 which exerts a progressively increasing counter-force reaching a maximum of 200 pounds when the piston has reached the limit of its stroke also has little effect on the movement of such piston. This is due to the fact that as the torsion bar 171 would have to be stressed an additional 2,000 p. s. i. to effect 45 degrees displacement of the lever 166', it is apparent that the effective force imparted to lever 166' by the upward movement of the wheel is equal to 2,000 pounds. As lever 166' and the leg 149 of rock lever 151 have a ratio of 10 to 1, in the illustrative embodiment herein, the force applied to move the piston 102 downwardly is 20,000 pounds which will readily overcome the maximum resistance of 200 pounds of spring 126 even when it is fully compressed.

With respect to springs 104, 105 as such springs only serve to urge the associated piston upwardly so that it will follow the corresponding upward movement of the associated end of the rock lever, such springs need be of but slight tension even when fully compressed and consequently will offer no appreciable resistance to the downward movement of the piston 102, 103 in the associated chambers. It is apparent therefore that the movement of piston 102 from its intermediate position shown in Fig. 6 to its extreme downward position will occur very rapidly, and hence there will be be substantially no restraint on the free upward movement of the wheel as it hits a bump so that substantially no jarring of the vehicle will occur as it will continue to move in substantially the same horizontal plane as it did before the impact.

When torsion bar 171 has been stressed as above described, due to a wheel riding over a bump the tendency of the torsion bar to unstress would cause the chassis of the vehicle to be lifted rapidly with respect to such wheel. Such movement of the chassis would unstress the torsion bar beyond its intermediate or normal condition when it is under a stress illustratively of 2,000 p. s. i. and the chassis would then fall by reason of its weight of 2,000 pounds on each wheel. Such movement of the chassis would normally continue for some time before the intermediate or normal condition was reached and retained and an unpleasant oscillation would occur. Such oscillation however, is prevented by the shock absorber shown in Fig. 6 in the following manner:

As the stressed torsion bar 171 starts to unstress it will tend to rotate the shaft 153 in a clockwise direction. As a result, the levers 151 and 166' will also tend to rotate in a clockwise direction which, unless restrained would cause the chassis of the vehicle to rise with respect to the wheel and the piston 102 to move upwardly and the piston 103 to move downwardly under the urging of end 156 of leg 150 of rock lever 151. A slight downward movement of piston 103 will cause the fluid in chamber 99 to move the valve disk 124 onto its seat 122 to seal the outlet 114 of passageway 112. As the torsion bar 171 is under a stress of 2,000 p. s. i. greater than its stress at its intermediate or normal position, the force applied to move piston 103 downwardly at the beginning of its return movement will be 20,000 pounds by reason of the 10 to 1 ratio of lever 166' to leg 150. As the area of the undersurface 109 of piston 103 is 10 square inches, by the formula $F=P\times A$, 2,000 pounds per square inch will be exerted on the fluid in chamber 99. Such pressure of 2,000 pounds per square inch through opening 116, passageway 11 and outlet 113 will also be exerted against the valve disk 123 seated on said outlet 113.

As the area of outlet 113 in the illustrative embodiment herein is 1/10 of a square inch, by the formula $F=P\times A$, the force required to retain valve disk 123 seated is 200 pounds and as this is the force exerted by the fully compressed spring 126 against the valve disk 123, outlet 113 will be maintained closed. Thus, as both outlets 113 and 114 are sealed, no liquid can be displaced through the passageways 111, 112 from chamber 99 to chamber 98.

As a result, although the wheel of the vehicle has risen rapidly, the chassis of the vehicle will not rise immediately as the restraint on the free return movement of piston 103 to the intermediate position will prevent unstressing of torsion bar 171.

In order that the piston 103 may return slowly to its intermediate position so that the chassis of the vehicle can rise to its normal position with respect to the raised wheel to ready the shock absorber for the next shock initiated impact, means are provided to permit escape of fluid from chamber 99 due to the force applied against such fluid by the piston 103. In the embodiment shown in Fig. 6, such escape of fluid is afforded by reason of the slight play between piston 103 and the wall of chamber 99 and fluid will seep from such chamber into the reservoir 93. As fluid is displaced from chamber 99 the piston 103 will move downwardly slowly and by reason of the fact that the end 156 of lever 151 will follow such piston, such lever will be rotated in a clockwise direction permitting the piston 102 to move upwardly in its chamber 98 thereby reducing the tension on spring 126. Such movement will permit unstressing of the torsion bar 171 and slow rise of the chassis of the vehicle with respect to the wheels.

As the stress on torsion bar 171 decreases, say to 1,000 p. s. i. above its normal or intermediate stress, the force applied to piston 103 will also decrease to 10,000 pounds and the pressure on the fluid in chamber 99 will correspondingly decrease to 1,000 p. s. i. Although the force of spring 126 has also been reduced by reason of its extension with the upward movement of piston 102, the spring is so designed that when the pressure on the fluid in chamber 99, due to the unstress of torsion bar 171 has fallen to 1,000 p. s. i., the tension of spring 126 will be 100 pounds which is sufficient to retain the valve disk 123 seated.

It is apparent therefore, that as the pistons 102 and 103 move slowly to their intermediate position, the torsion bar 171 will be gradually unstressed from a tension of 4,000 p. s. i. to a tension of 2,000 p. s. i. at which time the weight of 2,000 pounds on the wheel of the vehicle will effect an equilibrium. Thus, substantially no oscillation of the chassis of the vehicle will occur.

At this time both springs 104 and 126 will be unstressed and the shock absorber will be ready for the next shock initiated impact.

The operation of the shock absorber shown in Fig. 6 in the event that one of the wheels of the vehicle should ride into a hole or depression in the road, is identical to the operation above described, except that the piston 103 will initially be forced downwardly and the piston 102 upwardly and such pistons will thereupon start to return to the intermediate position. As the operations of these reverse movements will be obvious in view of the description heretofore made, they will not be described.

With the downward movement of piston 102 as previously described, as fluid flows through passageway 131, the disk 135 will be moved against plug 136 to seal bore 137. As a result, substantially all of the fluid displaced from chamber 98 through passageway 112 will pass into chamber 99. Similarly, when piston 103 moves downwardly from the position shown in Fig. 6, the fluid displaced from chamber 99 as it passes through passageway 111 through outlet 113 into chamber 98 will also fill passageway 113 to retain disk 135 seated over bore 137. Thus, regardless of the initial direction of movement of pistons 102, 103, the bore 137 will be closed so that fluid displaced from one of the chambers 98, 99 through the associated passageways 111, 112 will be precluded from passing into the reservoir.

When the pistons 102, 103 are in the intermediate position shown in Fig. 6, substantially no pressure will be exerted on the fluid in chambers 98, 99 and hence the valve disc 135 will remain on its seat 134. Consequently, fluid will flow from reservoir 93 through bore 137 and passageway 131 into chamber 98. As the reservoir 93 is above the level of the chamber 98, the fluid from such reservoir will fill such chamber to ready the shock absorber for action.

Upon the return movement of the piston 103 from its outermost position to its intermediate position shown in Fig. 6, in the event the pressure of the fluid in passageway 111 should exceed a predetermined amount such as if insufficient fluid should seep between piston 103 and the wall of chamber 99, the ball valve 145 will be displaced from its seat so that such fluid may flow into reservoir 93 to relieve the excess pressure thereby preventing injury to the equipment.

The reaction of the embodiments of the shock absorbers above described is substantially zero for the shock initiated stroke or movement of the wheel from its intermediate or neutral position to its extreme position. For the return stroke, the reaction of the shock absorber at all times is equal to the difference between the weight of the vehicle on such wheel and the reaction of the suspension spring of the vehicle which mounts the wheel.

As the difference between the force caused by the weight of the vehicle and the force caused by the reaction of the spring suspension plus the reaction of the shock absorber is zero, the return movement of the wheel to its intermediate or neutral position which is caused by the seepage of oil from the piston chambers into the reservoir will be relatively slow, hence, when the wheel reaches its neutral position, it will not move further. Consequently no oscillation occurs and substantially no jarring will be imparted to the vehicle.

As the shock absorber may be completely sealed, no dirt may enter the device and hence there is no likelihood of jamming of the operating parts thereof.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A shock absorber comprising a casing having a pair of chambers therein, a fluid reservoir in communication with said chambers to charge the latter, piston means slidably mounted in said chambers, and movable from an intermediate position to either of two opposed extreme positions in each chamber, means defining a restricted path for escape of fluid from each of said chambers to said reservoir, a pair of passageways providing communication between said chambers, said passageways having an inlet and an outlet respectively positioned in each chamber, check valve means in each chamber coacting with said outlets to close the latter, resilient means in each of said chambers controlled by said piston means and reacting when stressed against the associated valve means to retain the latter in sealing position with respect to said outlets, said resilient means being substantially unstressed when said piston means is in the intermediate position and when said piston means is withdrawn from the associated chamber, and being stressed when said piston means is moved into the associated chamber, whereby the movement of the piston means from such intermediate position toward one of said extreme positions in one of said chambers will be substantially unimpeded and the return movement of said piston means toward the other position will be restrained.

2. The combination set forth in claim 1 in which said casing is sealed.

3. The combination set forth in claim 1 in which said piston means is actuated by a lever and the quotient of the force exerted on said piston means by said lever to move the piston means from its extreme withdrawn position in one of said chambers back to the intermediate position in said chamber and the cross sectional area of the piston in said chamber, is substantially equal to the quotient of the force exerted by the resilient means in the other chamber and the cross section area of the outlet in such chamber.

4. The combination set forth in claim 1 in which said casing is rigidly affixed to the chassis of a vehicle and a spring mounts each of the wheels of the vehicle on said chassis, a lever connected at one end to one of said wheels and operatively connected to said spring actuates said piston means and the difference between the force applied to the lever by the weight of the vehicle on a wheel and the reaction of the associated mounting spring provides a resultant force to move the piston means from its extreme withdrawn position in one of said chambers back to the intermediate position in said chamber which is substantially equal to the product of the tension on the resilient means in the other chamber and the cross sectional area of the outlet in said other chamber.

5. A shock absorber comprising a casing having a cylindrical elongated bore therein, a piston slidably mounted in said bore and movable from an intermediate position therein toward either end of said bore, said piston defining a pair of chambers in said bore between the ends of the latter and the adjacent ends of the piston, a fluid reservoir in communication with said chambers to charge the latter, means defining a restricted path for escape of fluid from each of said chambers to said reservoir, a pair of longitudinal passageways through said piston providing communication between said chambers, said passageways having an inlet and an outlet respectively positioned in each chamber, check valve means in each chamber co-acting with said outlets to close the latter, resilient means in each of said chambers controlled by said piston means and reacting when stressed against the associated valve means to retain the latter in sealing position with respect to said outlets, said resilient means being substantially unstressed when said piston is in the intermediate position and when said piston means is withdrawn from a chamber and being stressed when said piston is moved into a chamber, whereby the movement of the piston from such intermediate position toward one end of the bore is substantially unimpeded and the return movement of the piston to the intermediate position is restrained.

6. The combination set forth in claim 5 in which said piston has longitudinally aligned cylindrical cavities in each end thereof, said cavities each having a floor with an axial opening in communication with the outlets of said passageways and said valve means comprises a pair of cylindrical slide valves positioned respectively in each of said cavities and having a valve head adapted to seat on said axial opening to seal the latter, and an opening therethrough providing communication from the inlet of the associated passageway to the associated chamber.

7. The combination set forth in claim 5 in which said piston has longitudinally aligned cylindrical cavities in each end thereof, said cavities each having a floor with an axial opening in communication with the outlets of said passageways and said valve means comprises a pair of cup-shaped slide valves positioned respectively in each of said cavities, said valves each having an end wall with an axial valve head protruding therethrough adapted to seat on said axial openings respectively to seal the latter with said end wall spaced from the floor of said cavity and said end wall has a plurality of openings therethrough providing communication between the inlet of the associated passageway and the associated chamber.

8. The combination set forth in claim 5 in which a port is provided in said piston between one of said passageways and said reservoir and valve means are provided in said port to permit flow of fluid in one direction from said reservoir into said passageway.

9. The combination set forth in claim 5 in which a port is provided in said piston between one of said passageways and said reservoir and valve means are provided in said port to permit flow of fluid in one direction from said passageway into said reservoir.

10. The combination set forth in claim 5 in which a shaft is rotatably mounted on said casing and extends transversely of said bore above the latter, midway between the ends thereof, said piston has a central transverse cavity therein extending from the top surface of the piston to near the bottom surface thereof and an actuating arm is positioned at one end in said cavity and is affixed at its other end to said shaft.

11. The combination set forth in claim 5 in which said reservoir is positioned in said casing above said bore and the means to define said restricted path comprises a passageway provided between each of said chambers and said reservoir.

12. The combination set forth in claim 1 in which said chambers are vertically positioned in said casing, the piston means comprises a separate piston slidably mounted in each chamber, the fluid reservoir is above the level of the chambers and the resilient means in each of the chambers are controlled by the associated piston.

13. The combination set forth in claim 12 in which each of said chambers has a floor and the inlet and outlet of said passageways is positioned in said floor, said resilient means comprising a coil spring positioned between said piston and said valve means.

14. The combination set forth in claim 12 in which a shaft is rotatably mounted on said casing and extends transversely of said chambers above the latter, midway between the upper ends thereof, a rock lever having a central opening therein with a pair of legs extending in opposed direction therefrom is affixed to said shaft with the ends of said lever legs abutting against the top surfaces of said pistons, whereby upon oscillation of said shaft in opposite direction the pistons will alternately be moved into their respective chambers.

15. The combination set forth in claim 12 in which each of said chambers has a floor and a tensed coil spring is positioned in each of said chambers between the floor and the undersurface of the associated piston, a shaft is rotatably mounted in said casing and extends transversely of said chamber above the latter, midway between the upper ends thereof, a rock lever having a central opening therein with a pair of legs extending in opposed directions therefrom is affixed to said shaft with the ends of said lever legs abutting against the top surfaces of said pistons, whereby upon rotation of said shaft in one direction and movement of said leg against the associated piston, said piston will be moved into its respective chamber and the other of said pistons will be moved out of its chamber by the tensed coil spring.

References Cited in the file of this patent

UNITED STATES PATENTS

| 1,842,831 | Hunt | Jan. 26, 1932 |
| 2,169,335 | Best | Aug. 15, 1939 |
| 2,182,272 | Armstrong | Dec. 5, 1939 |
| 2,559,632 | Katz | July 10, 1951 |
| 2,559,968 | Katz | July 10, 1951 |

FOREIGN PATENTS

| 415,605 | Great Britain | Aug. 30, 1934 |
| 420,723 | Great Britain | Dec. 6, 1934 |